(12) United States Patent
Kim et al.

(10) Patent No.: US 10,795,336 B2
(45) Date of Patent: Oct. 6, 2020

(54) BALL-PITCHING CONTROL METHOD OF PITCHING MACHINE IN BASEBALL PRACTICE SYSTEM AND BASEBALL PRACTICE SYSTEM USING THE SAME

(71) Applicant: NEWDIN CONTENTS CO., LTD., Seoul (KR)

(72) Inventors: Se Hwan Kim, Daegu (KR); Bong Kyung Ko, Daejeon (KR); Sang Hyun Joo, Daejeon (KR)

(73) Assignee: NEWDIN CONTENTS CO., LTD., Seoul (KR)

( * ) Notice: Subject to any disclaimer, the term of this patent is extended or adjusted under 35 U.S.C. 154(b) by 0 days.

(21) Appl. No.: 16/342,206

(22) PCT Filed: Oct. 18, 2017

(86) PCT No.: PCT/KR2017/011535
§ 371 (c)(1),
(2) Date: Apr. 16, 2019

(87) PCT Pub. No.: WO2018/074844
PCT Pub. Date: Apr. 26, 2018

(65) Prior Publication Data
US 2019/0324423 A1 Oct. 24, 2019

(30) Foreign Application Priority Data
Oct. 20, 2016 (KR) .................. 10-2016-0136693

(51) Int. Cl.
*A63B 69/40* (2006.01)
*G05B 19/404* (2006.01)
(Continued)

(52) U.S. Cl.
CPC ........ *G05B 19/404* (2013.01); *A63B 69/0002* (2013.01); *A63B 69/406* (2013.01);
(Continued)

(58) Field of Classification Search
CPC ..... A63B 69/40; A63B 69/406; A63B 69/409; F41B 4/00
See application file for complete search history.

(56) References Cited

U.S. PATENT DOCUMENTS 4,632,088 A * 12/1986 Bruce .................. A63B 69/406
124/6
4,712,534 A * 12/1987 Nozato ................ A63B 69/406
124/3
(Continued)

FOREIGN PATENT DOCUMENTS

JP 2002-239052 A 8/2002
JP 4883516 B2 2/2012
(Continued)

OTHER PUBLICATIONS

International Search Report for PCT/KR2017/011535 dated Mar. 2, 2018 from Korean Intellectual Property Office.

*Primary Examiner* — John A Ricci
(74) *Attorney, Agent, or Firm* — Revolution IP, PLLC

(57) ABSTRACT

Disclosed are a ball-pitching control method of a pitching machine in a baseball practice system that is capable of automatically compensating for inclination of the pitching machine, which may occur depending on the installation environment of the pitching machine, based on the result of sensing performed by a sensing device for sensing a pitched ball or a hit ball without using a separate sensor or measurement device and that is capable of automatically self-correcting the displacement of the pitching machine from the original position thereof or the corrected position thereof over time due to external impact applied to the pitching machine or a manager's inaccurate correction of the pitching machine by analyzing the results periodically sensed by a
(Continued)

sensing device and the cumulative results of set ball pitching information of the pitching machine, and a baseball practice system using the same.

14 Claims, 5 Drawing Sheets

(51) Int. Cl.
*A63B 69/00* (2006.01)
*G05B 19/416* (2006.01)
*A63B 102/18* (2015.01)

(52) U.S. Cl.
CPC .... *G05B 19/416* (2013.01); *A63B 2069/0008* (2013.01); *A63B 2102/18* (2015.10); *A63B 2220/18* (2013.01); *A63B 2220/833* (2013.01); *G05B 2219/40021* (2013.01)

(56) References Cited

U.S. PATENT DOCUMENTS

| | | | | |
|---|---|---|---|---|
| 4,760,835 A | * | 8/1988 | Paulson | A63B 69/406 124/78 |
| 4,915,384 A | * | 4/1990 | Bear | A63B 24/0021 273/454 |
| 5,064,194 A | * | 11/1991 | Bixler | A63B 63/00 273/375 |
| 5,125,653 A | * | 6/1992 | Kovacs | A63B 69/406 124/78 |
| 5,195,744 A | * | 3/1993 | Kapp | A63B 69/406 473/451 |
| 5,333,855 A | * | 8/1994 | Silin | A63B 63/00 473/455 |
| 5,443,260 A | | 8/1995 | Stewart et al. | |
| 5,464,208 A | * | 11/1995 | Pierce | A63B 69/406 124/78 |
| 5,897,445 A | * | 4/1999 | Sanders | A63B 24/0003 473/421 |
| 8,267,404 B2 | * | 9/2012 | Grauzer | A63F 1/12 273/149 P |
| 10,471,330 B1 | * | 11/2019 | Hart | A63B 69/0002 |
| 2013/0319387 A1 | * | 12/2013 | Paulson | H02P 29/00 124/10 |

FOREIGN PATENT DOCUMENTS

| | | |
|---|---|---|
| KR | 20-0261518 Y1 | 1/2002 |
| KR | 10-1505931 B1 | 3/2015 |
| KR | 10-1543371 B1 | 8/2015 |
| KR | 10-1546666 B1 | 8/2015 |
| KR | 10-2015-0130791 A | 11/2015 |

\* cited by examiner

BALL-PITCHING CONTROL METHOD OF PITCHING MACHINE IN BASEBALL PRACTICE SYSTEM AND BASEBALL PRACTICE SYSTEM USING THE SAME

TECHNICAL FIELD

The present invention relates to a ball-pitching control method of a pitching machine in a baseball practice system that allows a user to hit, with a bat, a ball pitched by the pitching machine or a baseball practice system that allows a user to hit, with a bat, a ball pitched by the pitching machine in an indoor space of a predetermined size, senses the hit ball through a sensing device, and realizes a simulation image based on the result of sensing, such as a so-called screen baseball system, and a baseball practice system using the same.

BACKGROUND ART

With the recent increase in the number of people enjoying baseball, a baseball practice system, such as a so-called screen baseball system, has emerged, which overcomes the limitations of playing baseball in a large baseball stadium and allows people to enjoy playing a virtual baseball game while experiencing virtual reality, even in a small indoor space.

Typically, a screen baseball system is installed in an indoor space and has a batting area with a space of a predetermined size in which a user can bat and a screen capable of displaying a virtual baseball diamond. When a pitching machine installed on the back of the screen pitches a ball toward the batting area, a user who is ready to hit the ball in the batting area hits the ball pitched by the pitching machine. At this time, a sensing device senses the movement of the pitched ball and the movement of the ball hit by the user. Subsequently, based on the result of sensing, whether the pitched ball is a strike or a ball is determined, and an image simulating the trajectory of the hit ball is realized on the screen.

The pitching machine used in the baseball practice system, such as the screen baseball system, pitches balls at various pitching angles such that a user can hit the balls pitched with various types of pitches, whereby the user may take a batting practice or may enjoy a baseball game through batting.

In the baseball practice system, it is required for the pitching machine to pitch balls at various pitching angles in the upward-downward direction and the leftward-rightward direction, as described above. However, the pitching machine may be inclined due to the installation environment. For example, pitching machines of baseball practice systems installed at different sites may be inclined greatly or slightly, since the pitching machines are installed in different environments. Even in the case in which the pitching machines pitch balls under the same pitching conditions, therefore, the balls may be pitched under conditions different from actually set pitching conditions, and the pitching angles of the pitching machines at the respective sites may be different from each other even though the pitching conditions are the same.

In addition, the pitching machine may gradually become displaced from the original position thereof or the corrected position thereof over time due to external impact applied to the pitching machine or inaccurate correction of the pitching machine performed by a manager, whereby the ball may be pitched under conditions different from the pitching conditions set for pitching machine.

The related art is disclosed in prior art documents, such as Korean Patent Application No. 10-2015-0041844, Korean Patent Application No. 10-2015-0041861, Korean Patent Application No. 10-2014-0054105, U.S. Pat. No. 5,443,260, and Japanese Registered Patent No. 4743763.

DISCLOSURE

Technical Problem

It is an object of the present invention to provide a ball-pitching control method of a pitching machine in a baseball practice system that is capable of automatically compensating for inclination of the pitching machine, which may occur depending on the installation environment of the pitching machine, based on the result of sensing performed by a sensing device for sensing a pitched ball or a hit ball without using a separate sensor or measurement device such that the pitching machine accurately pitches the ball at a set pitching angle, and a baseball practice system using the same.

It is another object of the present invention to provide a ball-pitching control method of a pitching machine in a baseball practice system that is capable of automatically self-correcting the displacement of the pitching machine from the original position thereof or the corrected position thereof over time due to external impact applied to the pitching machine or a manager's inaccurate correction of the pitching machine by analyzing the results periodically sensed by a sensing device and the cumulative results of set ball pitching information of the pitching machine, rather than by performing manual work using a separate sensor or measurement device, and a baseball practice system using the same.

Technical Solution

In accordance with an aspect of the present invention, the above and other objects can be accomplished by the provision of a ball-pitching control method of a pitching machine in a baseball practice system including a sensing device for sensing a ball pitched toward a batting area by the pitching machine, a pitching angle of the pitching machine being adjustable, the ball-pitching control method including calculating a ball motion model using sensing data obtained as the result of the pitching machine pitching the ball at a predetermined pitching angle and the sensing device sensing the pitched ball, calculating a compensation factor for compensating for the degree of inclination of the pitching machine using the difference between the predetermined pitching angle and the calculated ball motion model, and applying the calculated compensation factor to the pitching machine such that the ball is pitched by the pitching machine in the state in which the degree of inclination of the pitching machine is compensated for when a user takes a baseball practice or plays a baseball game.

In accordance with another aspect of the present invention, there is provided a ball-pitching control method of a pitching machine in a baseball practice system including a sensing device for sensing a ball pitched toward a batting area by the pitching machine, a pitching angle of the pitching machine being adjustable, the ball-pitching control method including calculating and storing a ball motion model using sensing data obtained as the result of the pitching machine pitching the ball at a set pitching angle and the sensing device sensing the pitched ball when a baseball practice or a baseball game is performed, calculating a correction factor for correcting the difference between the set pitching angle of the pitching machine and a pitching angle calculated based on the ball motion model using information about the set pitching angle and information about the ball motion model, and applying the calculated correction factor to the pitching machine such that the pitching machine self-corrects the displacement thereof and pitches the ball when a user takes a baseball practice or plays a baseball game.

In accordance with another aspect of the present invention, there is provided a ball-pitching control method of a pitching machine in a baseball practice system including a sensing device for sensing a ball pitched toward a batting area by the pitching machine, a pitching angle of the pitching machine being adjustable, the ball-pitching control method including calculating a compensation factor for compensating for the degree of inclination of the pitching machine using a ball motion model calculated using sensing data obtained as the result of the pitching machine pitching the ball at a set pitching angle and the sensing device sensing the pitched ball, applying the calculated compensation factor to the pitching machine such that a user takes a baseball practice or plays a baseball game, storing information about the set pitching angle of the ball and information about the ball motion model calculated as the result of sensing performed by the sensing device whenever the pitching machine pitches the ball while the user takes the baseball practice or plays the baseball game during a predetermined period, calculating a correction factor for correcting the difference between the set pitching angle of the pitching machine and a pitching angle calculated based on the ball motion model using the information about the set pitching angle and the information about the ball motion model, and applying the calculated correction factor to the pitching machine such that the pitching machine self-corrects the displacement thereof that occurs during the period and pitches the ball.

In accordance with another aspect of the present invention, there is provided a baseball practice system including a pitching machine for pitching a ball toward a batting area, in which a user hits the ball, a pitching angle of the pitching machine being adjustable, a sensing device for sensing the ball pitched by the pitching machine and generating sensing data, and a control device for calculating a ball motion model pertaining to the pitched ball using the sensing data received from the sensing device, calculating a compensation factor for compensating for the degree of inclination of the pitching machine using the difference between a set pitching angle at which the pitching machine pitches the ball and the calculated ball motion model, and applying the calculated compensation factor to the pitching machine such that the ball is pitched by the pitching machine in the state in which the degree of inclination of the pitching machine is compensated for when the user takes a baseball practice or plays a baseball game.

In accordance with a further aspect of the present invention, there is provided a baseball practice system including a pitching machine for pitching a ball toward a batting area, in which a user hits the ball, a pitching angle of the pitching machine being adjustable, a sensing device for sensing the ball pitched by the pitching machine and generating sensing data, and a control device for calculating a ball motion model pertaining to the pitched ball using the sensing data received from the sensing device, storing, in a storage, information about a set pitching angle of the pitching machine and information about the calculated ball motion model whenever the pitching machine pitches the ball, and periodically correcting the displacement of the pitching machine that occurs during the period using the stored information about the set pitching angle and the stored information about the ball motion model such that the pitching machine performs self-correction.

Advantageous Effects

A ball-pitching control method of a pitching machine in a baseball practice system according to an embodiment of the present invention and a baseball practice system using the same have effects in that it is possible to automatically compensate for inclination of the pitching machine, which may occur depending on the installation environment of the pitching machine, based on the result of sensing performed by a sensing device for sensing a pitched ball or a hit ball such that the pitching machine accurately pitches the ball at an automatically set pitching angle without correction work using a separate sensor or measurement device and in that it is possible to compensate for inclination of the pitching machine based on the relationship between the sensing device and the pitching machine, thereby enabling pitching machines at different sites having different installation conditions to pitch balls with uniform accuracy.

In addition, a ball-pitching control method of a pitching machine in a baseball practice system according to another embodiment of the present invention and a baseball practice system using the same have effects in that it is possible to automatically self-correct the displacement of the pitching machine from the original position thereof or the corrected position thereof over time due to external impact applied to the pitching machine or a manager's inaccurate correction of the pitching machine by analyzing the results periodically sensed by a sensing device and the cumulative results of set ball pitching information of the pitching machine, and in that it is not necessary for the manager to frequently correct the pitching machine using a separate sensor or measurement device, whereby it is possible to more efficiently operate the baseball practice system.

BEST MODE

A ball-pitching control method of a pitching machine in a baseball practice system and a baseball practice system using the same according to the present invention will be described in detail with reference to the accompanying drawings.

A "baseball practice system" according to the present invention conceptually includes both a conventional baseball practice system, in which a pitching machine pitches a ball to allow batting practice and a user hits the pitched ball in a batting area, and a virtual baseball simulation system, which is installed in an indoor space, which has a batting area with a space of a predetermined size where a user can bat and a screen capable of displaying a virtual baseball field, and which is operated in such a manner that, when the pitching machine pitches a ball toward the batting area, a user who is ready to hit the ball in the batting area hits the ball pitched by the pitching machine, a sensing device senses the movement of the pitched ball and the movement of the ball hit by the user, and an image simulating the trajectory of the hit ball is realized on the screen based on the result of sensing. Hereinafter, the present invention will be described in detail.

Figure 1:
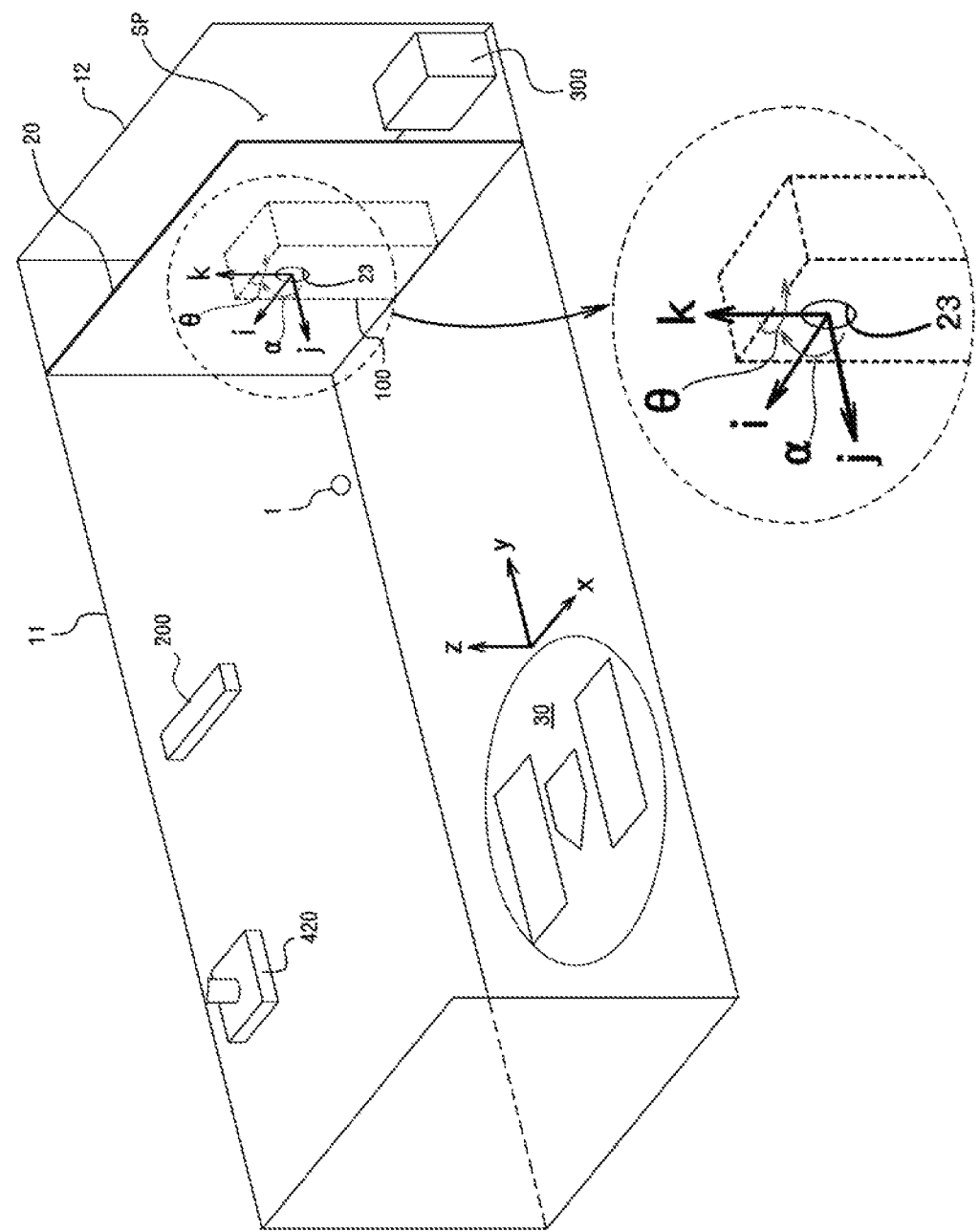
FIG. 1 is a view showing a virtual baseball simulation system, i.e. a so-called screen baseball system, which is an example of a baseball practice system according to an embodiment of the present invention.

First, a baseball practice system according to an embodiment of the present invention will be described with reference to FIGS. 1 and 2. FIG. 1 is a view showing a virtual baseball simulation system, i.e. a so-called screen baseball system, which is an example of a baseball practice system according to an embodiment of the present invention, and FIG. 2 is a block diagram showing the construction of the baseball practice system shown in FIG. 1.

In the same manner as a typical screen baseball system, as shown in FIG., a baseball practice system according to an embodiment of the present invention includes a batting area 30 and a screen 20, which are provided in a space defined by a side wall 11 and a rear wall 12, and is configured such that a user can swing and hit a ball with a bat in the batting area.

In a space SP defined between the screen 20 and the rear wall 12, a control device 300 for processing information about a baseball simulation image to be projected onto the screen 20 (the image processed by the control device 300 is projected onto the screen 20 through an image output device 420) may be provided, and a pitching machine 100 that is capable of pitching a ball 1 toward the batting area 30 may be installed. A pitching hole 23 may be formed in the screen 20 at a position corresponding to the portion of the pitching machine 100 from which the ball is pitched such that the ball 1 can pass though the pitching hole 23.

Figure 2:
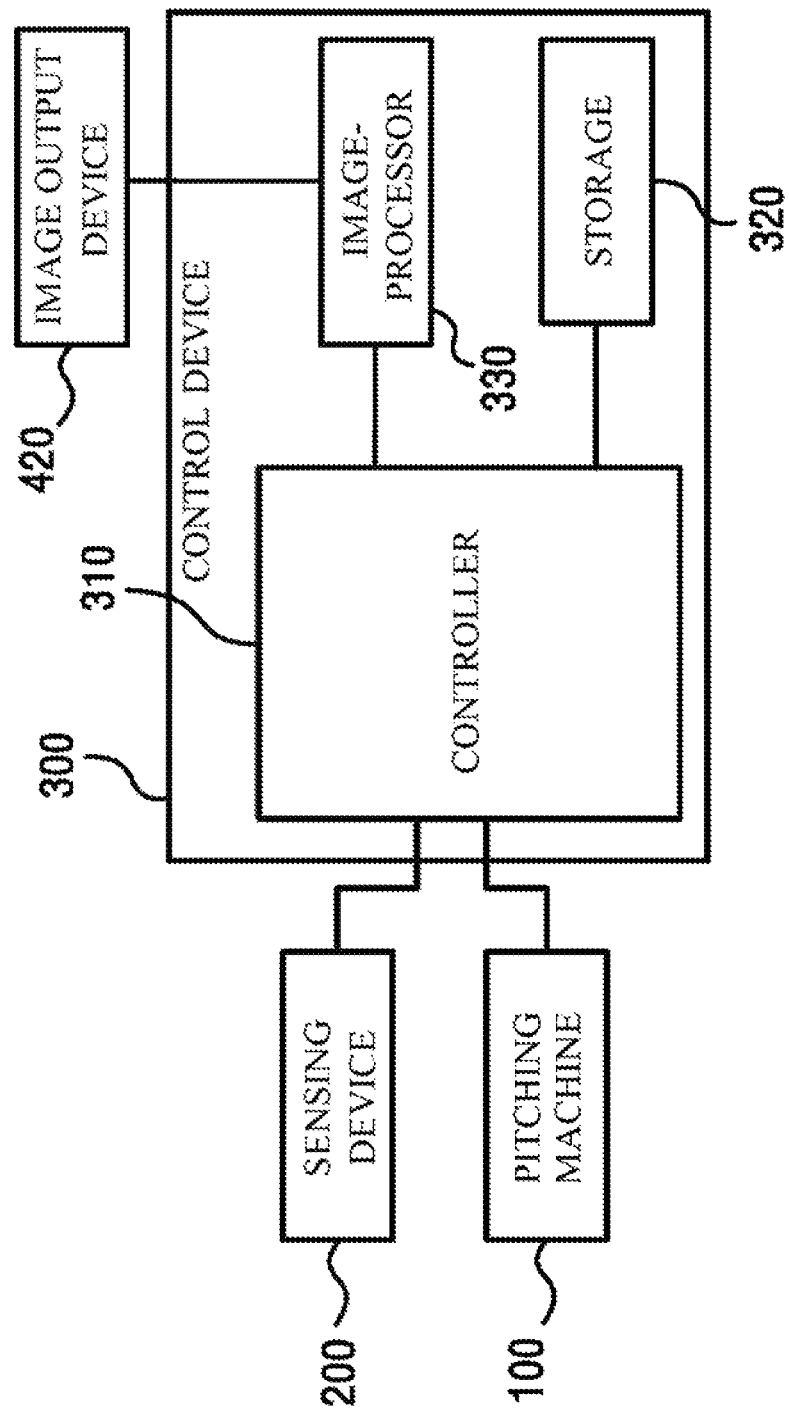
FIG. 2 is a block diagram showing the construction of the baseball practice system shown in FIG. 1.

As shown in FIGS. 1 and 2, the baseball practice system according to the embodiment of the present invention may include a control device 300, a pitching machine 100, and a sensing device 200.

The pitching machine 100 may be realized in various forms, and may include all pitching machines that are commonly used or disclosed. Basically, the pitching machine 100 may include a ball supply device, a pitching-driving device, and a pitching controller.

That is, the pitching machine is configured such that, when the ball supply device supplies balls one by one from a storage box, in which a plurality of balls is stored, to the pitching driving device, the pitching controller controls the pitching driving device based on preset pitching conditions (pitching conditions that are input manually or pitching conditions that are set while a virtual baseball simulation game is being played), and the pitching-driving device pitches a ball, supplied by the ball supply device, toward the batting area.

For example, the pitching-driving device may be realized so as to rotate a single wheel and pitch a ball placed between the wheel and a guide plate using the rotational force of the wheel (e.g. Japanese Patent Application Publication No. 2014-217468), may be realized so as to rotate two or more wheels, to locate a ball between the wheels, and to pitch the ball using the rotational force of the wheels (e.g. Korean Patent Application Publication No. 2014-0100685, Korean Registered Patent No. 0411754, and Korean Registered Utility Model No. 0269859), or may be realized so as to pitch a ball by rotating an arm holding the ball (e.g. Korean Registered Patent No. 0919371).

A pitching machine according to an embodiment of the present invention may include a pitching angle adjustment unit for moving or tilting the pitching-driving device in the upward-downward direction and/or in the leftward-rightward direction in order to adjust the direction in which a ball is pitched, i.e. a pitching angle. The pitching controller may control the pitching angle adjustment unit such that the pitching-driving device can pitch balls at set pitching angles and thus can pitch balls with various types of pitches toward the batting area.

That is, as shown in FIG. 1, the pitching machine according to the embodiment of the present invention may set at least one of an upward-downward pitching angle $\alpha$ or a leftward-rightward pitching angle $\theta$ based on an i-j-k coordinate system, and may pitch a ball at the set pitching angle. Here, the above i-j-k coordinate system, which is a coordinate system based on which the pitching machine sets a pitching angle, i.e. the angle at which a ball is pitched, may be referred to as a "pitching coordinate system".

Meanwhile, the sensing device 200 may be operated in various modes. An example of the sensing device may be operated in a mode in which a plurality of optical sensor devices, each of which includes a plurality of light-emitting sensors and a plurality of light-receiving sensors, is installed in the path along which a pitched ball or a hit ball moves such that, when the ball passes by the optical sensor devices, the light-receiving sensors receive the light emitted by the light-emitting sensors and reflected by the ball, whereby each of the optical sensor devices acquires information about the coordinates of the ball in order to calculate parameters such as the speed and direction of the pitched ball or the hit ball based on the information about the coordinates of the ball.

Alternatively, the sensing device 200 may be operated in another mode in which the sensing device analyzes a captured image in order to sense an object in the image. Specifically, the sensing device 200 may acquire and analyze an image of a predetermined image-capture range including the batting area in order to calculate information about the motion of a ball pitched by the pitching machine and to calculate information about the motion of a ball hit by a user. The sensing device may be operated in the optical sensing mode and the image sensing mode in combination.

That is, a sensing device according to an embodiment of the present invention is configured to sense a ball that is pitched by the pitching machine and to calculate sensing data about the position of the ball. A ball motion model describing the trajectory of a moving ball may be calculated based on the sensing data by the sensing device or a controller, a description of which will follow.

The baseball practice system according to the embodiment of the present invention shown in FIG. 1 includes an image-sensing-type sensing device 200 including a camera and a sensing-processor. Calculation of a ball motion model based on sensing data sensed by the image-sensing-type sensing device 200 is disclosed in Korean Patent Application No. 10-2016-0004526, filed in the name of the applicant of the present application.

As disclosed in Korean Patent Application No. 10-2016-0004526, the image-sensing-type sensing device 200 may include a camera and a sensing-processor. The camera successively acquires images of a predetermined image-capture range including the batting area. The sensing-processor receives the images from the camera, performs image analysis according to predetermined conditions, analyzes the collected images to extract three-dimensional coordinate data of balls in the images, determines a ball motion model pertaining to a pitched ball or a hit ball using the extracted three-dimensional coordinate data, and calculates, using the determined ball motion model, various kinds of information necessary for a baseball practice or a baseball game using the baseball practice system.

Here, the ball motion model may be expressed by a motion equation describing the trajectory of a ball that is pitched or hit in a three-dimensional space. As shown in FIG. 1, a space in which a baseball practice or a baseball game using the baseball practice system according to the present invention is performed may be defined based on a three-dimensional coordinate system including an x-axis, a y-axis, and a z-axis such that the ball motion model can be determined based on the defined coordinate system.

The x-y-z coordinate system shown in FIG. 1 is a coordinate system based on which the sensing device senses a moving ball, and will be hereinafter referred to as a "sensing coordinate system".

In the case in which the pitching coordinate system, which is a coordinate system based on which the pitching machine pitches a ball, is rotated 180 degrees about the z-axis of the sensing coordinate system, which is a coordinate system based on which the sensing device senses a ball, the coordinate axes of the pitching coordinate system and the sensing coordinate system become parallel to each other.

The ball motion model may be defined by a motion equation in the x-axis direction, a motion equation in the y-axis direction, and a motion equation in the z-axis direction. A detailed method of calculating the ball motion model is disclosed in Korean Patent Application No. 10-2016-0004526.

Meanwhile, as shown in FIG. 2, the control device 300 may include a storage 320, an image-processor 330, and a controller 310.

The storage 320 is a unit for storing data for processing a baseball simulation image in the baseball practice system and storing information about a pitching angle that is set whenever a ball is pitched by the pitching machine and information about a ball motion model calculated whenever a ball is pitched by the pitching machine. The storage 320 may be configured to serve as a storage space for temporarily storing data received from a server (not shown).

The image-processor 330 processes image data according to a predetermined program in order to generate various kinds of baseball-simulation-related images including a background image such as an image of a virtual baseball field and images of players, umpires, spectators, and the like, an image of a virtual pitcher pitching a ball, and an image simulating the trajectory of a ball hit by a user. The processed image is transmitted to the image output device 420. The image output device 420 outputs the received image by, for example, projecting the received image onto the screen 20 such that the user can see the image.

The controller 310 controls each component of the baseball practice system according to the present invention and performs various operations for realizing a baseball simulation image, such as an image simulating the trajectory of a hit ball, based on various kinds of information received from the sensing device 200.

The sensing device may directly calculate the ball motion model using sensing data, or the controller 310 may calculate the ball motion model using sensing data received from the sensing device.

Hereinafter, a ball-pitching control method of the pitching machine in the baseball practice system according to the present invention will be described with reference to the flowcharts shown in FIGS. 3 and 4.

First, a ball-pitching control method of a pitching machine in a baseball practice system according to an embodiment of the present invention will be described with reference to FIG. 3.

A description will be given on the assumption that the sensing device 200 and the pitching machine 100 of the baseball practice system according to the embodiment of the present invention are installed, as shown in FIG. 1.

It is impossible to install the pitching machine 100 on a surface that is perfectly level with mathematical accuracy. For this reason, the pitching machine may be somewhat inclined depending on the environment in which the pitching machine is installed.

Consequently, when the pitching machine 100 pitches a ball 1 at the upward-downward pitching angle α and the leftward-rightward pitching angle θ based on the i-j-k coordinate system, in actuality, the ball is not pitched at the pitching angle α and the pitching angle θ, since the pitching machine is inclined, as described above.

Figure 3:
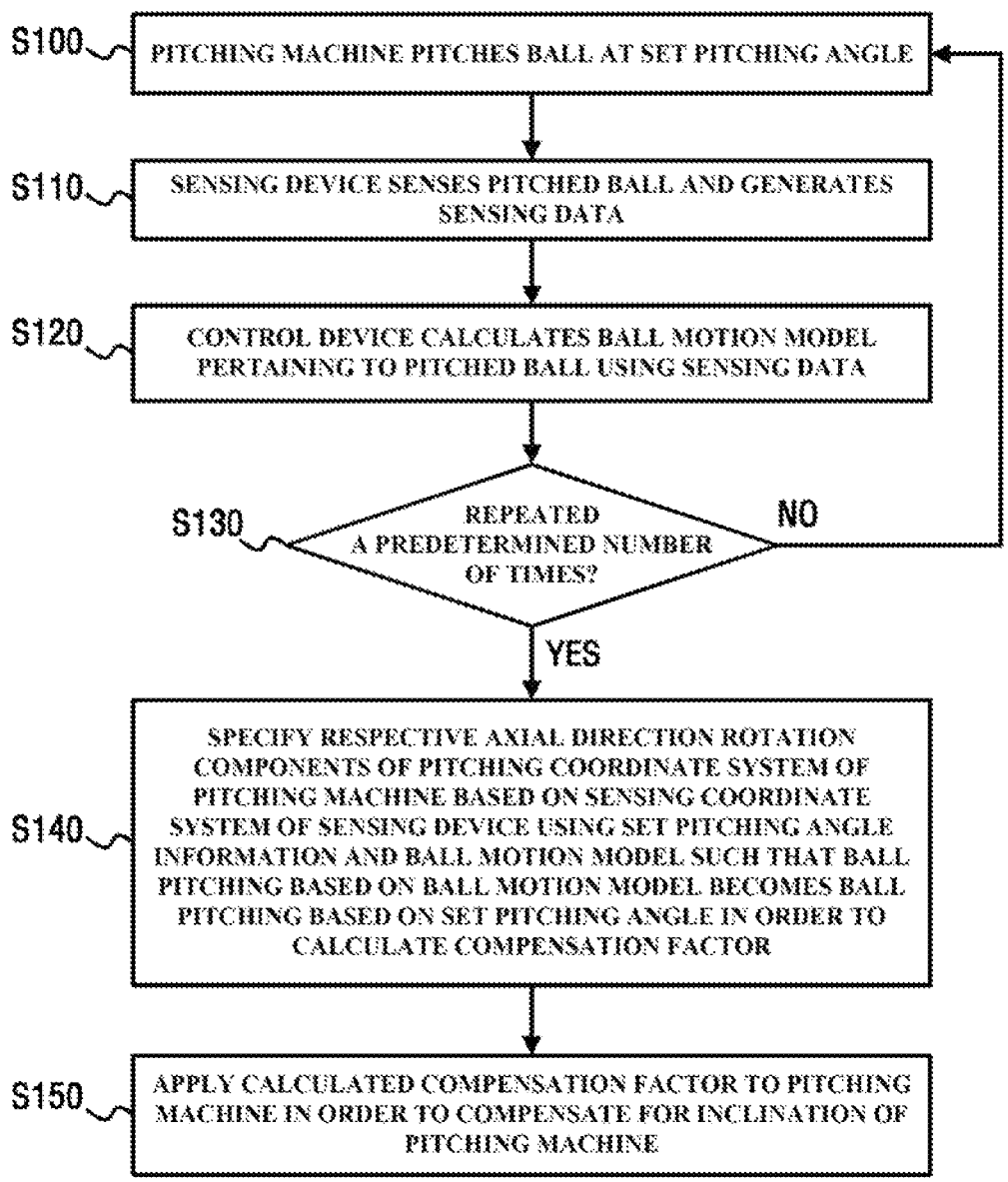
FIGS. 3 and 4 are flowcharts illustrating examples of a ball-pitching control method of a pitching machine in the baseball practice system according to the present invention.

The flowchart shown in FIG. 3 shows an example of a method of compensating for inclination of the pitching machine in order to accurately realize the pitching angle to be controlled when the ball is pitched such that the pitching machine accurately pitches a ball based on the set pitching angle.

To this end, first, the pitching machine pitches a ball at a set pitching angle (S100), the sensing device senses the pitched ball and generates sensing data (S110), and the control device (or the sensing device) calculates a ball motion model pertaining to the pitched ball using the sensing data (S120). The detailed method by which the sensing device or the control device calculates the ball motion model based on the sensing data is disclosed in Korean Patent Application No. 10-2016-0004526, as previously described.

According to this, the ball motion model may be calculated based on the x-y-z coordinate system. As described above, the ball motion model may be calculated using a motion equation in the x-axis direction, a motion equation in the y-axis direction, and a motion equation in the z-axis direction. Each of the following ball motion models is a function of time.

<Ball Motion Model>

$x = ax*t + bx$ (a motion equation in the x-axis direction)

$y = ay*t + by$ (a motion equation in the y-axis direction)

$z = az*t + bz - 0.5*g*t^2$ (a motion equation in the z-axis direction)

Here, t indicates the time value, g indicates the acceleration of gravity, x, y, and z indicate the coordinates in the respective axial directions, ax and ay indicate increments (inclinations) of the x and y coordinates, respectively, over time t, and ax and ay indicate the x and y coordinate values (intercepts), respectively, when t is 0.

In addition, az indicates the z-directional speed when t is 0, and bz indicates the z coordinate value (intercept) when t is 0.

Steps S100, S110, and S120 are repeated a predetermined number of times while the preset pitching angle is changed every time (S130). For example, the following three cases may be repeated.

Case 1—the case in which the pitching machine pitches a ball at a set upward-downward pitching angle α1 and a set leftward-rightward pitching angle θ1

Case 2—the case in which the pitching machine pitches a ball at a set upward-downward pitching angle α2 and a set leftward-rightward pitching angle θ2

Case 3—the case in which the pitching machine pitches a ball at a set upward-downward pitching angle α3 and a set leftward-rightward pitching angle θ3

Here, the upward-downward pitching angles α1, α2, and α3 are different values, and the leftward-rightward pitching angles θ1, θ2, and θ3 are different values.

In the case in which information about the set pitching angles of the above cases is applied to the ball motion models, the following equations may be acquired.

<Case 1>

$$x1=ax1*t+bx1$$

$$y1=ay1*t+by1$$

$$z1=az1*t+bz1-0.5*g*t^2$$

<Case 2>

$$x2=ax2*t+bx2$$

$$y2=ay2*t+by2$$

$$z2=az2*t+bz2-0.5*g*t^2$$

<Case 3>

$$x3=ax3*t+bx3$$

$$y3=ay3*t+by3$$

$$z3=az3*t+bz3-0.5*g*t^2$$

Meanwhile, steps S100, S110, and S120 are repeated three times in order to acquire results, and respective axial direction rotation components of the pitching coordinate system of the pitching machine are specified based on the sensing coordinate system of the sensing device using information about the set pitching angle and the ball motion model such that ball pitching based on the ball motion model becomes ball pitching based on the set pitching angle using the acquired results in order to calculate a compensation factor for compensating for the inclination of the pitching machine (S140).

The compensation factor rotates the pitching coordinate system based on the sensing coordinate system in order to perform compensation. Consequently, the compensation factor may be expressed as a rotation matrix that converts the pitching coordinate system into the sensing coordinate system, or may be expressed as a matrix having rotation components of Euler angles $\Psi c$, $\delta c$, and $\Phi c$ based on the x, y, and z axes of the sensing coordinate system. Eventually, calculating the compensation factor is calculating the rotation components $\Phi c$, $\Psi c$, and $\delta c$.

In order to calculate the compensation factor, first, the ball-pitching position of the pitching machine is calculated based on the ball motion model calculated using the sensing data acquired by the sensing device.

In the case in which the capture range of the camera of the sensing device includes the ball-pitching portion of the pitching machine, the point of time at which a ball initially appears in an image acquired by the sensing device may become the ball-pitching position, and the position at which the time t is 0 in the ball motion model may become the ball-pitching position.

In the case in which the capture range of the camera of the sensing device is formed from a position spaced apart from the ball-pitching point of the pitching machine by a predetermined distance, however, the position at which the time t is 0 in the ball motion model cannot be regarded as the ball-pitching position, since the sensing device senses a ball a predetermined time after the ball is pitched by the pitching machine.

Consequently, it is preferable to calculate the ball-pitching position using a highly accurate method that can be applied to all cases irrespective of the capture range of the camera of the sensing device.

Of course, instead of calculating the ball-pitching position based on the sensing coordinate system of the sensing device using the ball motion model, as described above, the ball-pitching position may be measured and calculated in advance based on the sensing coordinate system, and information about the previously calculated ball-pitching position may be used.

Hereinafter, a method of calculating information about the ball-pitching position using the ball motion model will be described.

The ball motion model based on the sensing data acquired by the sensing device has the same ball-pitching position, since the ball is pitched by the pitching machine. The ball-pitching position is expressed as POx, POy, and POz corresponding to the position of the pitching machine on the x-axis, y-axis, and z-axis.

In the case in which the ball-pitching position POx, POy, and POz is applied to the ball motion model, the following equation is satisfied. In the following equation, tp indicates the time at which the ball is at the ball-pitching position POx, POy, and POz.

<Ball Motion Model at Ball-Pitching Position>

$$POx=ax*tp+bx$$

$$POy=ay*tp+by$$

$$POz=az*tp+bz-0.5*g*tp^2$$

In the case in which the ball-pitching position POx, POy, and POz is applied to case 1, case 2, and case 3, the following results may be obtained.

<Case 1>

$$POx=ax1*tp1+bx1$$

$$POy=ay1*tp1+by1$$

$$POz=az1*tp1+bz1-0.5*g*tp1^2$$

<Case 2>

$$POx=ax2*tp2+bx2$$

$$POy=ay2*tp2+by2$$

$$POz=az2*tp2+bz2-0.5*g*tp2^2$$

<Case 3>

$$POx=ax3*tp3+bx3$$

$$POy=ay3*tp3+by3$$

$$POz=az3*tp3+bz3-0.5*g*tp3^2$$

Here, the time values tp1, tp2, and tp3 mean the time values at which the ball reaches the ball-pitching position POx, POy, and POz in the ball motion model. In each case, each axis motion equation is the same motion model obtained by disassembling a ball motion model describing a ball in each axial direction (an equation parametrized about time), and therefore the time values tp1, tp2, and tp3 are the same values.

When time is removed from the POx and POy equations in the above three cases, therefore, the following results may be obtained.

<Case 1>

$$POx-bx1=(ax1/ay1)*(POy-by1)$$

<Case 2>

$$POx-bx2=(ax2/ay2)*(POy-by2)$$

<Case 3>

$$POx-bx3=(ax3/ay3)*(POy-by3)$$

Here, POx and POy are unknown quantities, and ax, ay, bx, and by are values of the ball motion model measured by the sensing device. In the case in which at least two cases are measured, therefore, the position POx and POy of the pitching machine may be acquired.

In addition, when the number of cases is increased to three or more in order to further improve accuracy, it is possible to acquire the position POx and POy, the error of which is minimized through a least square method (LSM), since the number of equations is larger than the number of solutions.

In the above three cases, the equations may be expressed as a matrix as follows.

$$\begin{bmatrix} 1 & -ax1/ay1 \\ 1 & -ax2/ay2 \\ 1 & -ax3/ay3 \end{bmatrix} \begin{bmatrix} POx \\ POy \end{bmatrix} = \begin{bmatrix} bx1 & -(ax1/ay1)*by1 \\ bx2 & -(ax2/ay2)*by2 \\ bx3 & -(ax3/ay3)*by3 \end{bmatrix}$$

In this case, the matrix equation takes the form of A*X=B, and therefore the solution, the error of which is minimized through pseudo inversion, may be acquired through the following equation.

$$X=(A^TA)^{-1}A^TB$$

When POx and POy, acquired as described above, are used, times tp1, tp2, and tp3 may be acquired in each case. When each of the acquired times is substituted in the z-axis motion equation $POz=az*tp+bz-0.5*g*tp^2$ of a corresponding one of the cases, POz1, POz2, POz3, . . . may be acquired for the respective cases. POz may be calculated using a method of acquiring a representative value, such as the average of the above values or the average obtained by removing the maximum and minimum values.

Meanwhile, as previously described, the set pitching angle of the pitching machine is different from the pitching angle at which the ball is actually pitched, which means that there is a difference between the set pitching angle of the pitching machine and the ball motion model measured by the sensing device.

Consequently, the above compensation factor, i.e. the rotation matrix, may be calculated using the difference between the set pitching angle and the ball motion model.

That is, the compensator factor for compensating for the degree of inclination of the pitching coordinate system based on the sensing coordinate system may be calculated using the difference between the set pitching angle of the pitching machine and the ball motion model. This serves to calculate the respective axial direction rotation components of the pitching coordinate system as Euler angles Ψc, δc, and Φc based on the x-axis, y-axis, and z-axis of the sensing coordinate system, respectively, in order to correct the pitching coordinate system based on the sensing coordinate system such that ball pitching based on the ball motion model becomes ball pitching based on the set pitching angle of the pitching machine, as previously described.

First of all, it is assumed that the rotation matrix for converting the pitching coordinate system into the sensing coordinate system is Rc. Rc includes the respective axial direction rotation components Ψc, δc, and Φc, and Rc may be expressed as follows.

<Equation Pertaining to Rotation Matrix Rc>

$$Rc = \begin{bmatrix} \cos(\Phi c) & -\sin(\Phi c) & 0 \\ \sin(\Phi c) & \cos(\Phi c) & 0 \\ 0 & 0 & 1 \end{bmatrix} \begin{bmatrix} \cos(\delta c) & 0 & \sin(\delta c) \\ 0 & 1 & 0 \\ -\sin(\delta c) & 0 & \cos(\delta c) \end{bmatrix}$$

$$\begin{bmatrix} 1 & 0 & 1 \\ 0 & \cos\Psi c & -\sin(\Psi c) \\ 0 & \sin(\Psi c) & \cos(\Psi c) \end{bmatrix}$$

In addition, the conversion relationship of converting the pitching coordinate system into the sensing coordinate system using the rotation matrix Rc may be expressed as follows.

$$[x,y,z]=Rc*[i,j,k]$$

Figure 5:
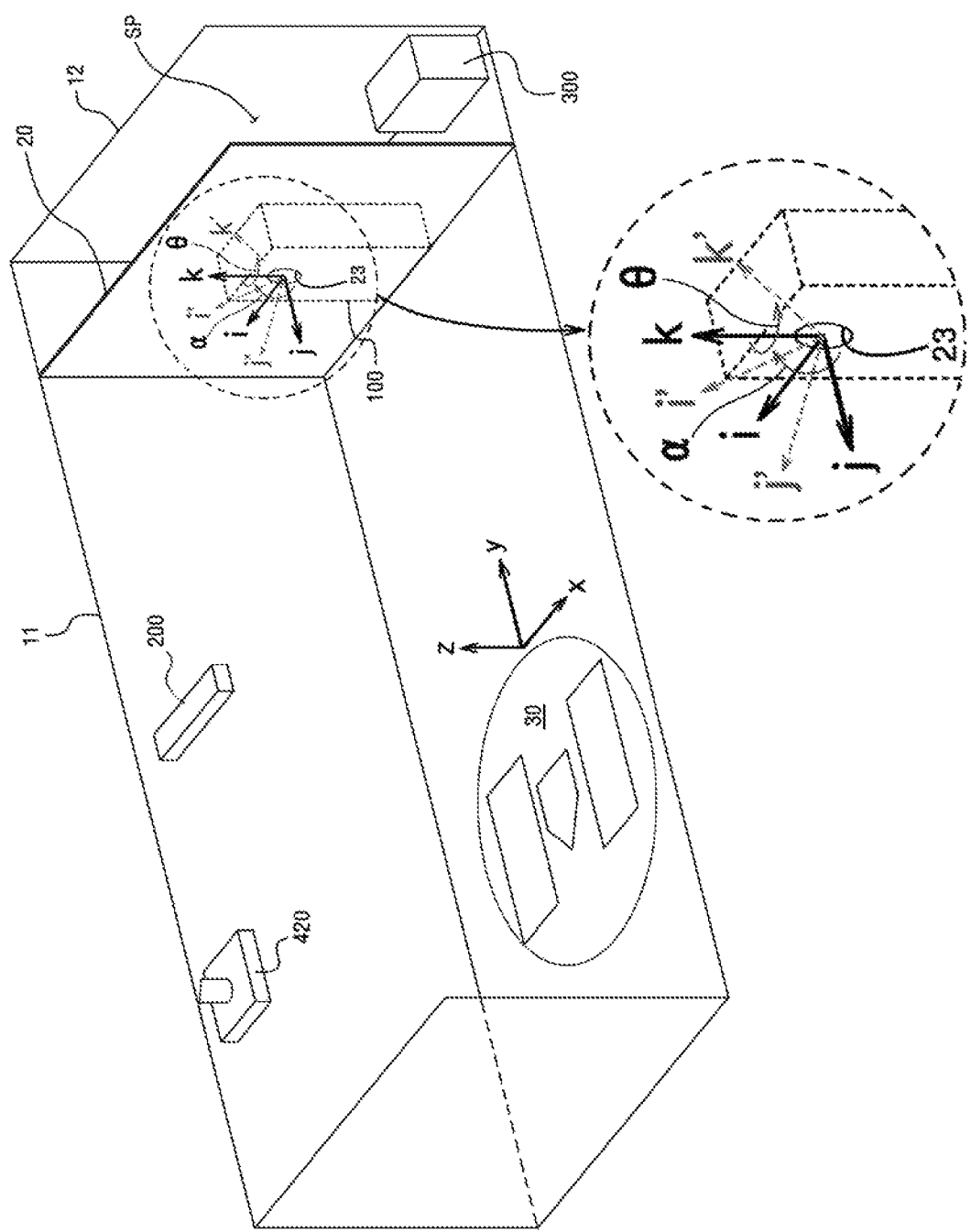
FIG. 5 is a reference view illustrating the ball-pitching control method shown in FIGS. 3 and 4.

Meanwhile, on the assumption that the coordinate system formed when the pitching coordinate system (i, j, k) is rotated by α and θ in the upward-downward direction and the leftward-rightward direction, respectively, is (i', j', k'), as shown in FIG. 5, that the pitching machine 100 pitches a ball at the pitching angles α and θ means that the ball is pitched in the j'-axis direction in the coordinate system (i', j', k'). When the pitching machine 100 pitches a ball at a speed vp in the j'-axis direction, the j'-axis direction is expressed as follows in the coordinate system (i, j, k).

$$j' = \begin{bmatrix} -\sin(\theta) \\ \cos(\alpha)*\cos(\theta) \\ \sin(\alpha)*\cos(\theta) \end{bmatrix}_{(i,j,k)}$$

Here, α and θ are, respectively, the set upward-downward pitching angle and the set leftward-rightward pitching angle, which are known values, vp is an unknown value, and Ψc, δc, and Φc of Rc are values to be calculated. When the pitching machine pitches a ball at the speed vp in the j'-axis direction in FIG. 5 in order to calculate the same, a velocity vector VP may be obtained as follows in the case in which the same is converted into the coordinate system (x, y, z).

<Equation Pertaining to Velocity Vector when Ball is Pitched>

$$VP = (vp)*Rc*\begin{bmatrix} -\sin(\theta) \\ \cos(\alpha)*\cos(\theta) \\ \sin(\alpha)*\cos(\theta) \end{bmatrix}$$

Since the position POx, POy, and POz of the pitching machine was calculated previously, the same may be used, or a value obtained by measuring the ball-pitching position of the pitching machine may be used in order to form the following equation.

<Ball Motion Model Pertaining to Velocity Vector at Ball-Pitching Position>

$$C\_x = VP(x)*t + Pox$$

$$C\_y = VP(y)*t + POy$$

$$C\_z = VP(z)*t + POz - 0.5*g*t^2$$

Here, C_x, C_y, and C_z on the trajectory of the ball based on the ball motion model mean arbitrary position, and VP(x), VP(y), and VP(z) respectively mean the x-axis, y-axis, and z-axis direction components of the velocity vector VP when the ball is pitched.

The above equations are motion equations describing the ball motion model at the position of the pitching machine, i.e. the ball-pitching position POx, POy, and POz.

Since the x-axis, y-axis, and z-axis direction intercepts of the ball in the <ball motion model>, i.e. bx, by, and bz, are substituted in the <ball motion model pertaining to the velocity vector at the ball-pitching position>, it is possible to obtain x-axis, y-axis, and z-axis direction equations of the ball motion model from the ball-pitching position to the position bx, by, and bz as follows.

<Ball Motion Model from Ball-Pitching Position to Position bx, by, and bz>

$$bx = VP(x)*tb + POx$$

$$by = VP(y)*tb + POy$$

$$bz = VP(z)*tb + POz - 0.5*g*t^2$$

Here, the time value tb means the time taken for the moving ball to reach the position bx, by, and bz.

The above bx, by, and bz respectively mean intercepts of x-axis, y-axis, and z-axis direction motion equations of the ball in the <ball motion model>, i.e. respective axial direction position values, when the time t is 0, and correspond to the position when the sensing device initially senses the ball.

In the case in which the <equation pertaining to the velocity vector when the ball is pitched> is applied to the equations of the <ball motion model from the ball-pitching position to the position bx, by, and bz>, the following results may be obtained.

$$bx = vp*(Rc(1,1)*(-\sin(\theta)) + Rc(1,2)*\cos(\alpha)*\cos(\theta) + Rc(1,3)*\sin(\alpha)*\cos(\theta))*tb + POx$$

$$by = vp*(Rc(2,1)*(-\sin(\theta)) + Rc(2,2)*\cos(\alpha)*\cos(\theta) + Rc(2,3)*\sin(\alpha)*\cos(\theta))*tb + POy$$

$$bz = vp*(Rc(3,1)*(-\sin(\theta)) + Rc(3,2)*\cos(\alpha)*\cos(\theta) + Rc(3,3)*\sin(\alpha)\cos(\theta))*tb + POz - 0.5*g*tb^2$$

Here, bx and by may be arranged such that the two equations are divided in order to obtain the following equation.

$$\frac{(bx - POx)}{(by - POy)} = \frac{(Rc(1,1)*(-\sin(\theta)) + Rc(1,2)*\cos(\alpha)*\cos(\theta) + Rc(1,3)*\sin(\alpha)*\cos(\theta))}{(Rc(2,1)*(-\sin(\theta)) + Rc(2,2)*\cos(\alpha)*\cos(\theta) + Rc(2,3)*\sin(\alpha)*\cos(\theta))}$$

The above equation may be arranged with respect to bx in order to obtain the following equation.

<Equation Pertaining to bx>

$$bx = \frac{(Rc(1,1)*(-\sin(\theta)) + Rc(1,2)*\cos(\alpha)*\cos(\theta) + Rc(1,3)*\sin(\alpha)*\cos(\theta))}{(Rc(2,1)*(-\sin(\theta)) + Rc(2,2)*\cos(\alpha)*\cos(\theta) + Rc(2,3)*\sin(\alpha)*\cos(\theta))}(by - POy) + POx$$

In addition, bz and by may be arranged such that the two equations are divided in order to obtain the following equation, in the same process as above.

$$\frac{(bz - POz + 0.5*g*tb^2)}{(by - POy)} = \frac{(Rc(3,1)*(-\sin(\theta)) + Rc(3,2)*\cos(\alpha)*\cos(\theta) + Rc(3,3)*\sin(\alpha)*\cos(\theta))}{(Rc(2,1)*(-\sin(\theta)) + Rc(2,2)*\cos(\alpha)*\cos(\theta) + Rc(2,3)*\sin(\alpha)*\cos(\theta))}$$

The above equation may be arranged with respect to bz in order to obtain the following equation.

<Equation Pertaining to bz>

$$bz = \frac{(Rc(3,1)*(-\sin(\theta)) + Rc(3,2)*\cos(\alpha)*\cos(\theta) + Rc(3,3)*\sin(\alpha)*\cos(\theta))}{(Rc(2,1)*(-\sin(\theta)) + Rc(2,2)*\cos(\alpha)*\cos(\theta) + Rc(2,3)*\sin(\alpha)*\cos(\theta))}*(by - POy) + POz - 0.5*g*tb^2$$

VP(x), which is the x-axis direction component of the velocity vector VP, and VP(y), which is the y-axis direction component of the velocity vector VP, means velocities in the x-axis direction and the y-axis direction, respectively, which perform linear motion at uniform velocity. Consequently, ax of the x-axis direction motion equation and ay of the y-axis direction motion equation of the <ball motion model> have the same values as VP(x) and VP(y), respectively.

Consequently, the relationship of by=VP(y)*tb+POy=ay*tb+POy is formed in the <ball motion model from the ball-pitching position to the position bx, by, and bz>, and the same may be derived in order to calculate the arrival time tb from the ball-pitching position to the position bx, by, and bz as follows.

<Equation Pertaining to tb>

$$tb = (by - POy)/ay$$

Since tb is calculated using information about the ball-pitching position and the ball motion model, as described above, the unknown quantity in the <equation pertaining to bx> and the <equation pertaining to bz> is Rc alone.

In order to acquire the rotation matrix Rc, an arbitrary candidate rotation matrix Re may be set and the <equation pertaining to bx> and the <equation pertaining to bz> may be used in order to acquire Rc.

On the assumption that the candidate rotation matrix Re has Euler angles $\Psi e$, $\delta e$, and $\Phi e$, the candidate rotation matrix Re may be expressed as the following equation.

$$Re = \begin{bmatrix} \cos(\Phi e) & -\sin(\Phi e) & 0 \\ \sin(\Phi e) & \cos(\Phi e) & 0 \\ 0 & 0 & 1 \end{bmatrix} \begin{bmatrix} \cos(\delta e) & 0 & \sin(\delta e) \\ 0 & 1 & 0 \\ -\sin(\delta e) & 0 & \cos(\delta e) \end{bmatrix}$$

-continued $$\begin{bmatrix} 1 & 0 & 1 \\ 0 & \cos(\Psi e) & -\sin(\Psi e) \\ 0 & \sin(\Psi e) & \cos(\Psi e) \end{bmatrix}$$

In the case in which Re is applied to the <equation pertaining to bx> and the <equation pertaining to bz>, the following equations may be obtained.

$$bx\_esti =$$

$$\frac{\mathrm{Re}(1,1)*(-\sin(\theta))+\mathrm{Re}(1,2)*\cos(\alpha)*\cos(\theta)+}{\mathrm{Re}(1,3)*\sin(\alpha)*\cos(\theta))} * (by-POy)+POx$$
$$\frac{\mathrm{Re}(2,1)*(-\sin(\theta))+\mathrm{Re}(2,2)*\cos(\alpha)*\cos(\theta)+}{\mathrm{Re}(2,3)*\sin(\alpha)*\cos(\theta))}$$

$$bz\_esti = \frac{\mathrm{Re}(3,1)*(-\sin(\theta))+\mathrm{Re}(3,2)*\cos(\alpha)*\cos(\theta)+}{\mathrm{Re}(3,3)*\sin(\alpha)*\cos(\theta))} * (by-POy)+$$
$$\frac{\mathrm{Re}(2,1)*(-\sin(\theta))+\mathrm{Re}(2,2)*\cos(\alpha)*\cos(\theta)+}{\mathrm{Re}(2,3)*\sin(\alpha)*\cos(\theta))}$$

$$POz - 0.5 * g * tb^2$$

Here, bx_esti and bz_esti are values corresponding respectively to bx and bz, calculated when the arbitrary candidate rotation matrix Re is applied to the <equation pertaining to bx> and the <equation pertaining to bz>.

In the case in which the arbitrary candidate rotation matrix Re conforms to the rotation matrix Re to be acquired, bx_esti and bz_esti may conform respectively to bx and bz calculated by the <equation pertaining to bx> and the <equation pertaining to bz>.

Consequently, an appropriate value is extracted from an arbitrary candidate group Ψe, δe, and Φe with respect to Re and is applied to each of the above equations. When the calculated values of bx_esti and bz_esti most closely approach the values of bx and bz, i.e. when errors of the set (bx_esti, bz_esti) and the set (bx, bz) are minimized, the arbitrary candidate rotation matrix Re is selected as the rotation matrix Rc serving as the compensation factor, whereby the compensation factor is calculated.

In order to effectively and reliably calculate Rc using Re, as described above, the range of arbitrary angles to be applied to each of the arbitrary candidate groups Ψe, δe, and Φe may be appropriately set, and an error function for effectively setting values when errors of the set (bx_esti, bz_esti) and the set (bx, bz) are minimized may be applied.

For example, in the case in which the installation environment of the pitching machine is ideal, Ψe and δe are 0° and Φe is 180°. Consequently, the range of arbitrary angles may be preset such that Ψe is −10° to 10°, δe is −10° to 10°, and Φe is 170° ~190°, and a candidate group Ψe (1, 2, 3, . . . , m, . . . ), δe (1, 2, 3, . . . , n, . . . ), and Φe (1, 2, 3, . . . , p, . . . ) may be selected in predetermined units (for example, in units of 0.1°).

The selected Ψe(m), δe(n), and Φe(p) may be substituted into the <equation pertaining to bx> and the <equation pertaining to bz> while changing the same in order to acquire Re(m, n, p), and bx-esti1, bz_esti1, bx_esti2, bz_esti2, bx-esti3, and bz_esti3, corresponding respectively to the <case 1>, the <case 2>, and the <case 3>, may be calculated (of course, bx1, bz1, bx2, bz2, bx3, and bz3 may be acquired for each case).

In the case in which bx1, bz1, bx2, bz2, bx3, bz3, bx-esti1, bz_esti1, bx_esti2, bz_esti2, bx-esti3, and bz_esti3 are acquired, as described above, the same may be applied to the error equations defined as follows.

<Equation Pertaining to Error Function for Each Case>

$$E1 = (\sqrt{(bx\_esti1 - bx1)^2 + (bz\_esti1 - bz1)^2}$$

$$E2 = (\sqrt{(bx\_esti2 - bx2)^2 + (bz\_esti2 - bz2)^2}$$

$$E3 = (\sqrt{(bx\_esti3 - bx3)^2 + (bz\_esti3 - bz3)^2}$$

Here, E1, E2, and E3 are error function values in the <case 1>, the <case 2>, and the <case 3>, respectively.

The candidate group Ψe(m), δe(n), and Φe(p) is sequentially applied to the error function, and the values of Ψe, δe, and Φe when the value of E1+E2+E3 is minimized are selected as Ψc, δc, and Φc of the rotation matrix Rc, whereby Rc is finally determined.

The finally determined rotation matrix Rc may be applied to the pitching machine as a compensation factor in order to compensate for inclination of the pitching machine, which may occur depending on the installation environment of the pitching machine (S150).

For example, in the case in which the pitching angle of the pitching machine is set so as to have the upward-downward pitching angle α and the leftward-rightward pitching angle θ in order to control the pitching angle of the ball so as to have the upward-downward pitching angle α and the leftward-rightward pitching angle θ, a ball is pitched by the pitching machine at a different pitching angle due to the inclination of the pitching machine. In this case, the pitching coordinate system i, j, k may be rotated using the rotation matrix Rc in order to correct an error in the pitching machine due to the inclination of the pitching machine. When the pitching machine pitches a ball at the set pitching angle α and θ in this state, it is possible to accurately control the pitching angle of the ball.

Meanwhile, even in the case in which the inclination of the pitching machine, which may occur depending on the installation environment of the pitching machine, is compensated for using the compensation factor such that the pitching machine can perform accurate ball control, as shown in FIG. 3, the pitching machine may be displaced from the original position thereof or the corrected position thereof due to internal and external causes, such as external impact applied to the pitching machine or inappropriate or inaccurate correction of the pitching machine after the operation of the baseball practice system or an internal error in the pitching machine due to repetitive operation of the pitching machine (here, the "displacement" is defined as a concept including both the displacement of the pitching machine itself and an internal error in the pitching machine that occurs due to internal effects over time), whereby, it is difficult for the pitching machine to perform accurate ball control.

In this case, the compensation factor, previously described with reference to FIG. 3 may be calculated again and may be applied to the pitching machine in order to solve the problem in which the pitching machine is displaced. Alternatively, a "correction factor" may be calculated using a ball-pitching control method of a pitching machine in a baseball practice system according to another embodiment of the present invention shown in FIG. 4, in addition to the compensation factor, and the calculated correction factor may be applied to the pitching machine in order to solve the problem in which the pitching machine is displaced.

Hereinafter, a ball-pitching control method of the pitching machine that is capable of correcting the displacement of the pitching machine that occurs over time through the calculation and application of a correction factor such that the pitching machine performs self-correction and thus can pitch balls with substantially uniform accuracy will be described with reference to FIGS. 4 and 5.

Figure 4:
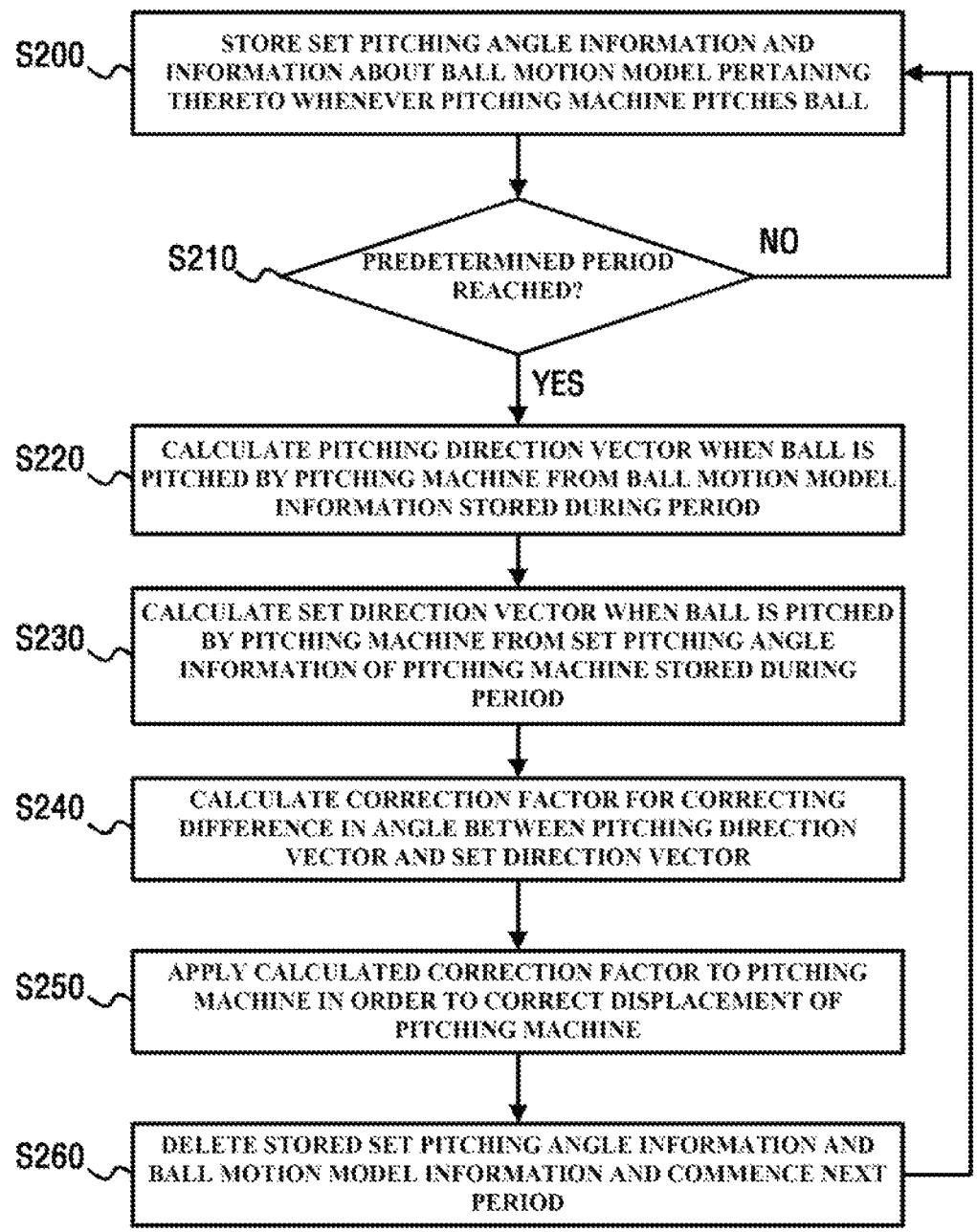

According to the control method shown in FIG. 4, a correction factor is calculated in order to correct the displacement of the pitching machine. The period for calculating the correction factor is preset, and information about a set pitching angle and information about a ball motion model calculated using sensing data acquired by the sensing device are stored in the storage 320 (see FIG. 2) whenever the pitching machine pitches a ball while a user takes a baseball practice or plays a baseball game during one period (S200).

In the case in which the information about the set pitching angle and the information about the ball motion model are stored whenever the ball is pitched, as described above, and a predetermined period is reached (S210), the control device calculates a pitching direction vector when the ball is pitched by the pitching machine from the information about the ball motion model stored during the period (S220), and calculates a set direction vector when the ball is pitched by the pitching machine from the information about the set pitching angle of the pitching machine stored during the period (S230).

The pitching direction vector is a direction vector when the ball is pitched by the pitching machine, calculated by the ball motion model, and the set direction vector is a direction vector when the ball is pitched by the pitching machine, calculated according to the pitching angle set for pitching machine.

In the case in which the pitching direction vector and the set direction vector are calculated, a correction factor for correcting the angular difference between the calculated pitching direction vector and the calculated set direction vector is calculated (S240), and the calculated correction factor is applied to the pitching machine in order to correct the displacement of the pitching machine, described above, using the correction factor (S250).

Subsequently, the information about the set pitching angle and the information about the ball motion model stored during the period are deleted, and the next period is commenced in order to store information about the set pitching angle and information about the ball motion model whenever the pitching machine pitches a ball (S260).

The calculation of the direction vector and the correction factor, described above, will be described in more detail.

In the process of calculating the "compensation factor", described above, the rotation matrix Rc for compensating for inclination of the pitching machine depending on the installation environment of the pitching machine is basically calculated and applied in order to compensate for the pitching coordinate system based on the sensing coordinate system using Rc. The basic relationship thereof is as follows.

$$[x,y,z]=Rc*[i,j,k]$$

In this embodiment, the "correction factor" further rotates the pitching coordinate system based on the sensing coordinate system in order to correct the displacement of the pitching machine, and may be expressed as a correction matrix Rs. In the case in which the correction matrix Rs is applied to the above equation, therefore, the following equation may be obtained.

$$[x,y,z]=Rs*Rc*[i,j,k]$$

That is, Rs is newly calculated and updated using data cumulatively periodically stored, whereby the displacement of the pitching machine, which may occur over time, is periodically self-corrected without separate correction work.

In the above equation, Rs may be added to Rc. Alternatively, Rc may be replaced with Rs. That is, the rotation matrix Rc for compensating for inclination of the pitching machine is not applied, but the correction matrix Rs for correcting the displacement of the pitching machine may be directly acquired and applied to the pitching machine such that the pitching machine performs accurate ball control.

Meanwhile, a data set of set pitching angle information of the pitching machine stored during one period in order to calculate the correction matrix Rs will be referred to as Pit_Angle_Set, and a data set of the ball motion model stored during the period will be referred to as Model_Set.

Pit_Angle_Set includes α(i), which corresponds to the upward-downward pitching angle of the ball, and θ(i), which corresponds to the leftward-rightward pitching angle of the ball, as elements, and Model_Set includes ax(i), bx(i), ay(i), by(i), az(i), and bz(i), which indicate coefficients of the respective axial direction motion equations, as elements. Here, (i) is appended to each element in order to indicate that there is a plurality of data for each element. That is, i may be 1, 2, 3 . . . , and, for example, α(1)=3°, α(2)=2.5°, α(3)=3.5° . . . . Hereinafter, elements having (i) attached thereto have the same meaning as above.

In the case in which the above elements are applied to the <ball motion model>, the following equations may be obtained.

<Ball Motion Model Pertaining to Data Set>

$$xp=ax(i)*t+bx(i)$$

$$yp=ay(i)*t+by(i)$$

$$zp=az(i)*t+bz(i)-0.5*g*t^2$$

Here, xp, yp, and zp indicate the position of the ball based on the time t, and g indicates the acceleration of gravity.

First, the direction vector of the ball when the ball is pitched by the pitching machine, i.e. the pitching direction vector, is acquired using the data set based on the ball motion model, i.e. Model_Set. To this end, the y-axis position POy of the pitching machine and the velocity vector VR(i) when the ball is pitched may be expressed using the following equation.

<Equation Pertaining to Time Tp and Velocity Vector VR>

$$tp(i)=(POy-by(i))/ay(i)$$

$$VR(i)=[a\_vx(i)a\_vy(i)a\_vz(i)-g*tp(i)]$$

Here, vx(i), vy(i), and vz(i) mean the x-axis, y-axis, and z-axis direction components of the velocity vector VR(i), respectively, and tp(i) means the time taken for the ball to move from the y-axis position POy of the pitching machine to the position by(i). In the above equation, the velocity vector VR(i) may be normalized in order to acquire a pitching direction vector VRn(i).

In addition, as the set pitching angle information of the pitching machine, the direction vector of the ball when the ball is pitched, i.e. the set direction vector VPn(i), may be acquired as follows. At this time, the upward-downward pitching angle and the leftward-rightward pitching angle of the ball are α(i) and θ(i), respectively.

$$VPn(i) = Rc * \begin{bmatrix} -\sin(\theta(i)) \\ \cos(\alpha(i)) * \cos(\theta(i)) \\ \sin(\alpha(i)) * \cos(\theta(i)) \end{bmatrix}$$

In the case in which there exists a correction matrix that has already been applied to the pitching machine during the previous period, the correction matrix is referred to as Rs_old. In this case, the set direction vector VPn(i) may be expressed as follows.

<Equation Pertaining to Set Direction Vector VPn(i)>

$$VPn(i) = Rs\_old * Rc * \begin{bmatrix} -\sin(\theta(i)) \\ \cos(\alpha(i)) * \cos(\theta(i)) \\ \sin(\alpha(i)) * \cos(\theta(i)) \end{bmatrix}$$

In the case in which the pitching machine is not displaced, the set direction vector VPn and the pitching direction vector VRn must be identical to each other. In the case in which the pitching machine is displaced, however, the set direction vector VPn and the pitching direction vector VRn have different values.

In this case, the correction matrix Rs may be applied such that the set direction vector VPn and the pitching direction vector VRn become identical to each other. As a result, the displacement of the pitching machine may be corrected.

It is assumed that the x-axis, y-axis, and z-axis components of the set direction vector VPn(i) are plx(i), ply(i), and plz(i), respectively, and that the x-axis, y-axis, and z-axis components of the pitching direction vector VRn(i) are rlx(i), rly(i), and rlz(i), respectively. In order to calculate the correction matrix Rs, first, a difference $\Delta\alpha(i)$ in the upward-downward pitching angle and a difference $\Delta\theta(i)$ in the leftward-rightward pitching angle between the set direction vector VPn and the pitching direction vector VRn may be expressed using the following equation.

<Equation Pertaining to Difference $\Delta\alpha(i)$ in Upward-Downward Pitching Angle Between Two Direction Vectors>

$$\Delta\alpha(i) = A\tan\left(\frac{rlz(i)}{\sqrt{rlx(i)^2 + rly(i)^2}}\right) - A\tan\left(\frac{plz(i)}{\sqrt{plx(i)^2 + ply(i)^2}}\right)$$

<Equation Pertaining to Difference $\Delta\theta(i)$ in Leftward-Rightward Pitching Angle Between Two Direction Vectors>

$$\Delta\theta(i) = A\tan\left(\frac{rlx(i)}{\sqrt{rly(i)^2}}\right) - A\tan\left(\frac{plx(i)}{\sqrt{ply(i)^2}}\right)$$

Here, Atan means arctangent

Since the difference $\Delta\alpha(i)$ in the upward-downward pitching angle and the difference $\Delta\theta(i)$ in the leftward-rightward pitching angle may change whenever the pitching machine pitches a ball, it is preferable to extract a representative value of the values of the difference $\Delta\alpha(i)$ in the upward-downward pitching angle and a representative value of the values of the difference $\Delta\theta(i)$ in the leftward-rightward pitching angle from cumulatively stored data.

As a method of extracting the representative value, the average of the total values may be used, the average of some of the total values within a predetermined range (for example, the average of the remaining values excluding the upper 30% and lower 30%) may be used, or the average of the values that occupy the largest group in the distribution of the total values (for example, a method of selecting the average from the data group having the largest quantity of data within a predetermined distance using dispersion or the standard deviation value) may be used.

The representative value of the difference in the upward-downward pitching angle and the representative value of the difference in the leftward-rightward pitching angle are referred to as $\Delta\alpha$_mean and $\Delta\theta$_mean, respectively.

Meanwhile, the correction matrix Rs for correcting the displacement of the pitching machine may be expressed using the difference in the upward-downward pitching angle and the difference in the leftward-rightward pitching angle as follows.

<Equation Pertaining to Correction Matrix Rs>

$$Rs = \begin{bmatrix} \cos(\Delta\theta) & -\sin(\Delta\theta) & 0 \\ \sin(\Delta\theta) & \cos(\Delta\theta) & 0 \\ 0 & 0 & 1 \end{bmatrix} * \begin{bmatrix} 1 & 0 & 0 \\ 0 & \cos(\Delta\alpha) & \sin(\Delta\alpha) \\ 0 & -\sin(\Delta\alpha) & \cos(\Delta\alpha) \end{bmatrix}$$

On the assumption that the correction matrix applied during the previous period is Rs_old and the correction matrix calculated during the current period is Rs_new, an error in the direction vector when Rs_old*Rc is applied to the equation pertaining to the displacement of the pitching machine [x, y, z]=Rs*Rc*[i, j, k] and an error in the direction vector when Rs_new*Rc is applied to the equation pertaining to the displacement of the pitching machine [x, y, z]=Rs*Rc*[i, j, k] may be compared with each other. In the case in which the error is further reduced, it is preferable to replace Rs_old with Rs_new.

Here, in order to acquire the error in the direction vector, a speed vr(i) when the ball is pitched may be acquired from the velocity vector VR(i) using the <equation pertaining to the velocity vector VR(i) for calculating the pitching direction vector> as follows.

<Equation Pertaining to Speed vr(i) when Ball is Pitched>

$$vr(i) = \sqrt{a\_vx(i)^2 + a\_vy(i)^2 + (a\_vz(i) - g*tp(i))^2}$$

In the case in which the speed vr(i) is multiplied by the correction matrix, velocity vectors V_old(i) and V_new(i) may be expressed as the following equations, since the velocity vectors have the same speed vr(i) and different directions.

$$V\_old(i) = vr(i) * Rs\_old * Rc * \begin{bmatrix} -\sin(\theta(i)) \\ \cos(\alpha(i)) * \cos(\theta(i)) \\ \sin(\alpha(i)) * \cos(\theta(i)) \end{bmatrix}$$

$$V\_new(i) = vr(i) * Rs\_new * Rc * \begin{bmatrix} -\sin(\theta(i)) \\ \cos(\alpha(i)) * \cos(\theta(i)) \\ \sin(\alpha(i)) * \cos(\theta(i)) \end{bmatrix}$$

In the case in which an error is further reduced when the values of bx(i), by(i), and bz(i) corresponding to the position data in the ball motion model are compared with the position data acquired using the velocity vector, a more accurate velocity vector is obtained.

As previously described, the time taken for the ball to move from the y-axis position POy of the pitching machine to the position by(i) is tp, and the x-axis and z-axis positions when the ball pitched by the pitching machine at speeds V_old(i) and V_new(i) reaches by(i) may be expressed as the following equations using the <ball motion model pertaining to the data set>.

<Equation Pertaining to x-Axis and z-Axis Positions when Ball Reaches by(i) from POy at Speed V_Old(i)>

$$xp\_v\_old(i)=POx+V\_old\_x(i)*tp(i)$$

$$zp\_v\_old(i)=POz+V\_old\_z(i)*tp(i)-0.5*g*tp(i)^2$$

<Equation Pertaining to x-Axis and z-Axis Positions when Ball Reaches by(i) from POy at Speed V_New(i)>

$$xp\_v\_new(i)=POx+V\_new\_x(i)*tp(i)$$

$$zp\_v\_new(i)=POz+V\_new\_z(i)*tp(i)-0.5*g*tp(i)^2$$

Here, POx and POz are x-axis and z-axis positions of the pitching machine, xp_v_old(i) and zp_v_old(i) are x-axis and z-axis positions when the ball pitched by the pitching machine at the speed V_old reaches by(i) in the y-axis direction, and xp_v_new(i) and zp_v_new(i) are x-axis and z-axis positions when the ball pitched by the pitching machine at the speed V_new reaches by(i) in the y-axis direction.

In addition, V_old_x(i) and V_old_z(i) indicate the x-axis and z-axis velocity vector components of V_old, respectively, and V_new_x(i) and V_new_z(i) indicate the x-axis and z-axis velocity vector components of V_new, respectively.

According to the <ball motion model pertaining to the data set>, x-axis and z-axis positions when the ball is located at by(i) due to the ball motion model acquired using the sensing data from the sensing device are bx(i) and bz(i), respectively. Consequently, errors in xp_v_old(i), zp_v_old(i), xp_v_new(i), and zp_v_new(i) are reduced when approaching bx(i) and bz(i).

On the assumption that a position error when the ball is pitched at a speed V_old(i) is Error_old and that a position error when the ball is pitched at a speed V_new(i) is Error_new, the result values based on the following error functions may be compared, and in the case in which the value of Error_new is smaller than the value of Error_old, it may be determined that the error is reduced.

<Position Error Function>

$$Error\_old = \Sigma \sqrt{xp\_v\_old(i)^2 + zp\_v\_old(i)^2}$$

$$Error\_new = \Sigma \sqrt{xp\_v\_new(i)^2 + zp\_v\_new(i)^2}$$

In the case in which the value of the error function Error_new is smaller than the value of the error function Error_old, the newly acquired correction matrix Rs_new may be applied in order to further reduce the error, which is proved based on the result of calculation of the error function, whereby it is possible to obtain reliability in the case in which the existing correction matrix Rs_old is replaced with the newly acquired correction matrix Rs_new, which is then applied.

When the calculation of the correction matrix Rs is completed, as described above, it is preferable to remove the previously stored data sets Pit_Angle_Set and Model_Set in order to repeat a process during the next period.

The calculation and application of the correction matrix in order to correct the displacement of the pitching machine may be further performed after the application of the compensation factor described above, or may be independently performed.

As described above, data are periodically stored and analyzed in order to calculate a correction matrix as a correction factor for correcting the displacement of the pitching machine, and the calculated correction matrix is applied to the pitching machine. Consequently, the pitching machine is capable of performing self-correction using the sensing device over time without the bother of a manager frequently performing separate calibration work, whereby it is possible to improve reliability in ball control accuracy.

INDUSTRIAL APPLICABILITY

The ball-pitching control method of the pitching machine in the baseball practice system and the baseball practice system using the same according to the present invention are industrially applicable in a technical field that allows a user to perform a baseball practice or play a virtual baseball game in such a manner that the user, with a bat, hits a ball pitched by the pitching machine in an indoor space of a predetermined size, and the sensing device senses the hit ball and realizes a simulation image on the screen in front of the user.

The invention claimed is:

1. A ball-pitching control method of a pitching machine in a baseball practice system comprising a sensing device for sensing a ball pitched toward a batting area by the pitching machine, a pitching angle of the pitching machine being adjustable, the ball-pitching control method comprising:
    calculating a ball motion model using sensing data obtained as a result of the pitching machine pitching the ball at a predetermined pitching angle and the sensing device sensing the pitched ball;
    calculating a compensation factor for compensating for a degree of inclination of the pitching machine using a difference between the predetermined pitching angle and the calculated ball motion model; and
    applying the calculated compensation factor to the pitching machine such that the ball is pitched by the pitching machine in a state in which the degree of inclination of the pitching machine is compensated for when a user takes a baseball practice or plays a baseball game.

2. The ball-pitching control method according to claim 1, wherein the step of calculating the compensation factor comprises calculating the compensation factor for compensating for a degree of inclination of a pitching coordinate system, which is a coordinate system based on which the pitching machine pitches the ball, based on a sensing coordinate system, which is a coordinate system based on which the sensing device senses the ball, using the difference between the predetermined pitching angle and the calculated ball motion model.

3. The ball-pitching control method according to claim 2, wherein the step of calculating the compensation factor comprises calculating respective axial direction rotation components of a pitching coordinate system, which is a coordinate system based on which the pitching machine pitches the ball, in order to correct the pitching coordinate system based on a sensing coordinate system, which is a coordinate system based on which the sensing device senses the ball, such that ball pitching based on the calculated ball motion model becomes ball pitching based on the predetermined pitching angle, thereby calculating the compensation factor.

4. The ball-pitching control method according to claim 1, wherein the sensing device is configured to successively capture and collect images of the ball moving within a predetermined monitoring area, to analyze the collected images in order to extract the ball from the images, and to extract coordinate data of the ball within a three-dimensional space, and the step of calculating the compensation factor comprises:

calculating information about a position of the ball, extracted by analyzing the images collected by the sensing device, at a specific point of time based on a sensing coordinate system of the sensing device; and applying arbitrary values of respective axial direction rotation components of a pitching coordinate system, which is a coordinate system based on which the pitching machine pitches the ball, to a function derived from the position of the ball at the specific point of time in order to calculate the compensation factor based on values of the respective axial direction rotation components when most closely approaching the calculated position of the ball at the specific point of time.

5. The ball-pitching control method according to claim 1, further comprising:

storing information about a set pitching angle of the pitching machine and information about a ball motion model calculated using sensing data acquired by the sensing device whenever the pitching machine pitches the ball; and periodically correcting a displacement of the pitching machine that occurs during the period using the stored information about the set pitching angle and the stored information about the ball motion model such that the pitching machine performs self-correction.

6. The ball-pitching control method according to claim 5, wherein the step of performing self-correction comprises calculating a correction factor for correcting a difference between the set pitching angle of the pitching machine and a pitching angle calculated based on the ball motion model using the information about the set pitching angle and the information about the ball motion model stored during a predetermined period, and applying the calculated correction factor to the pitching machine.

7. The ball-pitching control method according to claim 5, wherein the step of performing self-correction comprises:

calculating a pitching direction vector, which is a direction vector when the ball is pitched by the pitching machine from the information about the ball motion model stored during a predetermined period;

calculating a set direction vector, which is a direction vector when the ball is pitched by the pitching machine from the information about the set pitching angle stored during a predetermined period; and calculating a correction factor for correcting a difference in angle between the pitching direction vector and the set direction vector and applying the calculated correction factor to the pitching machine.

8. A ball-pitching control method of a pitching machine in a baseball practice system comprising a sensing device for sensing a ball pitched toward a batting area by the pitching machine, a pitching angle of the pitching machine being adjustable, the ball-pitching control method comprising:

calculating and storing a ball motion model using sensing data obtained as a result of the pitching machine pitching the ball at a set pitching angle and the sensing device sensing the pitched ball when a baseball practice or a baseball game is performed;

calculating a correction factor for correcting a difference between the set pitching angle of the pitching machine and a pitching angle calculated based on the ball motion model using information about the set pitching angle and information about the ball motion model; and applying the calculated correction factor to the pitching machine such that the pitching machine self-corrects a displacement thereof and pitches the ball when a user takes a baseball practice or plays a baseball game.

9. The ball-pitching control method according to claim 8, wherein the step of calculating and storing the ball motion model comprises storing information about the set pitching angle and information about the ball motion model whenever the ball motion model is calculated as a result of the pitching machine pitching the ball at the set pitching angle and the sensing device sensing the ball when the baseball practice or the baseball game is performed during a predetermined period, and the step of calculating the correction factor comprises:

calculating a difference between the set pitching angle and a pitching angle calculated based on the ball motion model using the information stored during the period;

determining one of an average of total values, an average of some of the total values within a predetermined range, or an average of values that occupy a largest group in a distribution of the total values to be a representative value of the difference; and calculating a correction factor for correcting the difference determined as the representative value.

10. The ball-pitching control method according to claim 8, wherein the step of calculating and storing the ball motion model, the step of calculating the correction factor, and the step of performing self-correction and pitching the ball are periodically executed, and the step of performing self-correction and pitching the ball comprises comparing an error calculated from a direction vector of the ball when the pitching machine pitches the ball based on a previous correction factor calculated and applied during a previous period using a predetermined error function with an error calculated from the direction vector based on a current correction factor calculated during a current period using the predetermined error function, and, in a case in which the error calculated from the direction vector based on the current correction factor is smaller, applying the current correction factor to the pitching machine.

11. A baseball practice system comprising:

a pitching machine for pitching a ball toward a batting area, in which a user hits the ball, a pitching angle of the pitching machine being adjustable;

a sensing device for sensing the ball pitched by the pitching machine and generating sensing data; and a control device for calculating a ball motion model pertaining to the pitched ball using the sensing data received from the sensing device, calculating a compensation factor for compensating for a degree of inclination of the pitching machine using a difference between a set pitching angle at which the pitching machine pitches the ball and the calculated ball motion model, and applying the calculated compensation factor to the pitching machine such that the ball is pitched by the pitching machine in a state in which the degree of inclination of the pitching machine is compensated for when the user takes a baseball practice or plays a baseball game.

12. The baseball practice system according to claim 11, wherein the control device is configured to calculate the compensation factor for compensating for a degree of inclination of a pitching coordinate system, which is a coordinate system based on which the pitching machine pitches the ball, based on a sensing coordinate system, which is a coordinate system based on which the sensing device senses the ball, using the difference between the set pitching angle and the calculated ball motion model.

13. The baseball practice system according to claim 11, wherein the control device is configured:
   to store, in a storage, information about the set pitching angle of the pitching machine and information about the calculated ball motion model whenever the pitching machine pitches the ball; and
   to periodically correct a displacement of the pitching machine that occurs during the period using the stored information about the set pitching angle and the stored information about the ball motion model such that the pitching machine performs self-correction.

14. The baseball practice system according to claim 13, wherein the control device is configured to calculate a correction factor for correcting a difference between the set pitching angle of the pitching machine and a pitching angle calculated based on the ball motion model using the information about the set pitching angle and the information about the ball motion model stored during a predetermined period and to apply the calculated correction factor to the pitching machine such that the ball is pitched by the pitching machine.

* * * * *